United States Patent [19]

Van den Heuvel

[11] Patent Number: 4,649,506

[45] Date of Patent: Mar. 10, 1987

[54] VECTOR GENERATOR USING INTERPOLATIVE ANALOG CIRCUITS

[76] Inventor: Raymond C. Van den Heuvel, 18618 Celtic St., Northridge, Calif. 91326

[21] Appl. No.: 588,351

[22] Filed: Mar. 12, 1984

[51] Int. Cl.[4] ........................ G06F 3/14; G09G 1/00; H01J 29/70

[52] U.S. Cl. .................................... 364/607; 315/367; 340/739; 364/521

[58] Field of Search ............... 364/607, 608, 719, 852, 364/521; 340/739, 742, 738; 315/367

[56] References Cited

U.S. PATENT DOCUMENTS

| | | | |
|---|---|---|---|
| 3,329,948 | 7/1967 | Halstead | 340/731 |
| 3,582,705 | 6/1971 | Waller | 315/367 |
| 3,609,444 | 9/1981 | Van den Heuvel | 315/367 |
| 3,983,865 | 10/1976 | Shepard | 128/777 |
| 3,996,928 | 12/1976 | Marx | 128/671 |
| 4,027,148 | 5/1977 | Rosenthal | 364/719 |
| 4,053,740 | 10/1977 | Rosenthal | 364/705 |
| 4,053,951 | 10/1977 | Hudspeth et al. | 364/415 |
| 4,056,713 | 11/1977 | Quinn | 364/521 |
| 4,150,284 | 4/1979 | Trenkler et al. | 455/608 |
| 4,216,462 | 8/1980 | McGrath et al. | 364/415 |
| 4,249,538 | 2/1981 | Musha et al. | 128/630 |
| 4,270,547 | 6/1981 | Steffen et al. | 128/671 |
| 4,311,997 | 1/1982 | Madni | 340/722 |
| 4,481,605 | 11/1984 | Chase | 364/719 |
| 4,500,879 | 2/1985 | Smith, III et al. | 340/739 |

*Primary Examiner*—Jerry Smith
*Assistant Examiner*—Clark A. Jablon

[57] ABSTRACT

Vector (i.e., line) drawings represent the "intelligence" content of images.

A method is disclosed for the gathering of intelligence and the generation of vectors on the screen of a CRT without the usual problems associated with cost and performance.

The Vector Generator itself uses pairs of digital-to-analog converters with a common analog output. This technique is referred to as interpolation. Careful shaping of the complementary reference voltages of the digital-to-analog converters results in constant velocity, transient-free vectors with starting and end points that are accurately controlled. Cumulative (i.e., closure) errors are entirely absent.

1 Claim, 10 Drawing Figures

VECTOR GENERATOR USING INTERPOLATIVE ANALOG CIRCUITS

BACKGROUND OF THE INVENTION

The popularity of personal computers and video game machines has spurred major improvements in the areas of microprocessors, video displays and speech and music synthesizers. However, due to lack of suitable motivation and long-range planning, the manufacturers of these machines have flooded the market with devices that are more commercially appealing than useful. More importantly, and for the same reasons, they have largely overlooked the needs of biomedicine and instrumentation in general.

NOVELTY OF THE INVENTION

This invention uses both old and new art in a new combination.

Perhaps the most novel aspect of this invention is that it accommodates a larger than previously possible number of dissimilar biological sensors to be specified later by the user.

Another novel aspect is that the invention defines the physical emplacement where some of the processing tasks must take place in order to optimize the efficiency, cost effectiveness and size of the major components.

A more subtle aspect is that in which synergetic processes are allowed to take place, both in hardware and software, such that the various sensors enhance each other's performance. The same phenomenon occurs on a vaster scale in the human brain where far-reaching conclusions can be reached based on only a few sensory clues. Of course, both for the computer and the brain, it is necessary to have access to a store of data reflecting past experience.

The approach taken in this invention is in some cases also novel in its choice of hardware to perform certain tasks and in the way it defines specific tasks differently than in the previous art. For instance, a small number of arrays of identical circuits, possibly in the form of low cost integrated circuits, is used to process the signals originating from a substantially larger number of diverse sensors. The differences in the sensor signals are reconciled in the computer rather than in the "front-end" circuits. Another example is the definition of internal input/output interfaces in the form of blocks of memory inside the computer itself. The result is that isolated computer programs can be changed and the number of microprocessors changed without necessitating drastic changes in the rest of the system. Yet another example is the fact that the readout circuits (such as the sound and picture generators) all feature identical input circuits consisting of latches into which is stored control and parameter information.

The generalized use of arrays and the use of standard functions is particularly amenable to LSI (Large Scale Integration), thus enhancing the future potential for small size and low cost.

SUMMARY OF THE INVENTION

The present invention addresses and overcomes significant shortcomings of the prior by providing, in a first aspect, a modular system for acquiring and processing data. Such system provides an interface module that includes at least one sensor for producing an analog signal representative of external information. The module additionally includes means for transforming the analog signal into an input data set having a digital format. The system further provides a computer module for accepting the input data set and transforming it into an output data set. Finally, a readout module is provided for accepting and processing the output data set so that the information is displayed in at least one predetermined format.

In a further aspect, the invention provides a vector generator. Such vector generator includes at least one first means for latching a first data point representing a vector coordinate and at least one second means for latching a second data point representing a vector coordinate. At least one means is provided for latching a data point representing a slew rate. Means are additionally provided for generating at least one first and second complementary monotonically time-varying reference signal. First means are provided for multiplying the first data point by the first reference voltage signal associated with each first means for latching and second means for multiplying the second data point with the second reference voltage signal associated with each second means for latching. Means are also provided for steering a first data point into a first means for latching while generating odd-numbered vectors and a second data point into a second means for latching when generating even-numbered vectors so that the data point is loaded into a means for latching when the value of the reference voltage signal applied to the associated means for multiplying is a minimum. A cathode ray tube and video circuitry are provided for displaying at least one vector and means is provided tor turning "on" the video circuitry and for controlling the "on" time interval to coincide with the time interval during which a first and second reference signal are between their maximum and minimum values.

In yet a further aspect, the invention provides a sound generator. The generator includes means for latching at least one data point representing sound parameters. Means are provided for generating a square wave having frequency in accordance with the data point and for generating an analog voltage having value in accordance with the slew rate information of the data point. Means are provided for transforming the square wave into a triangle wave.

Finally, a sound transducer is provided that is adapted to receive the triangle wave and generate sounds in response thereto.

The preceding and other features and advantages of the invention will become further apparent from the detailed description and drawing figures that follow the description and figures, including identifying numerals, like numerals referring to like features of the invention throughout.

DETAILED DESCRIPTION

Figure 1:
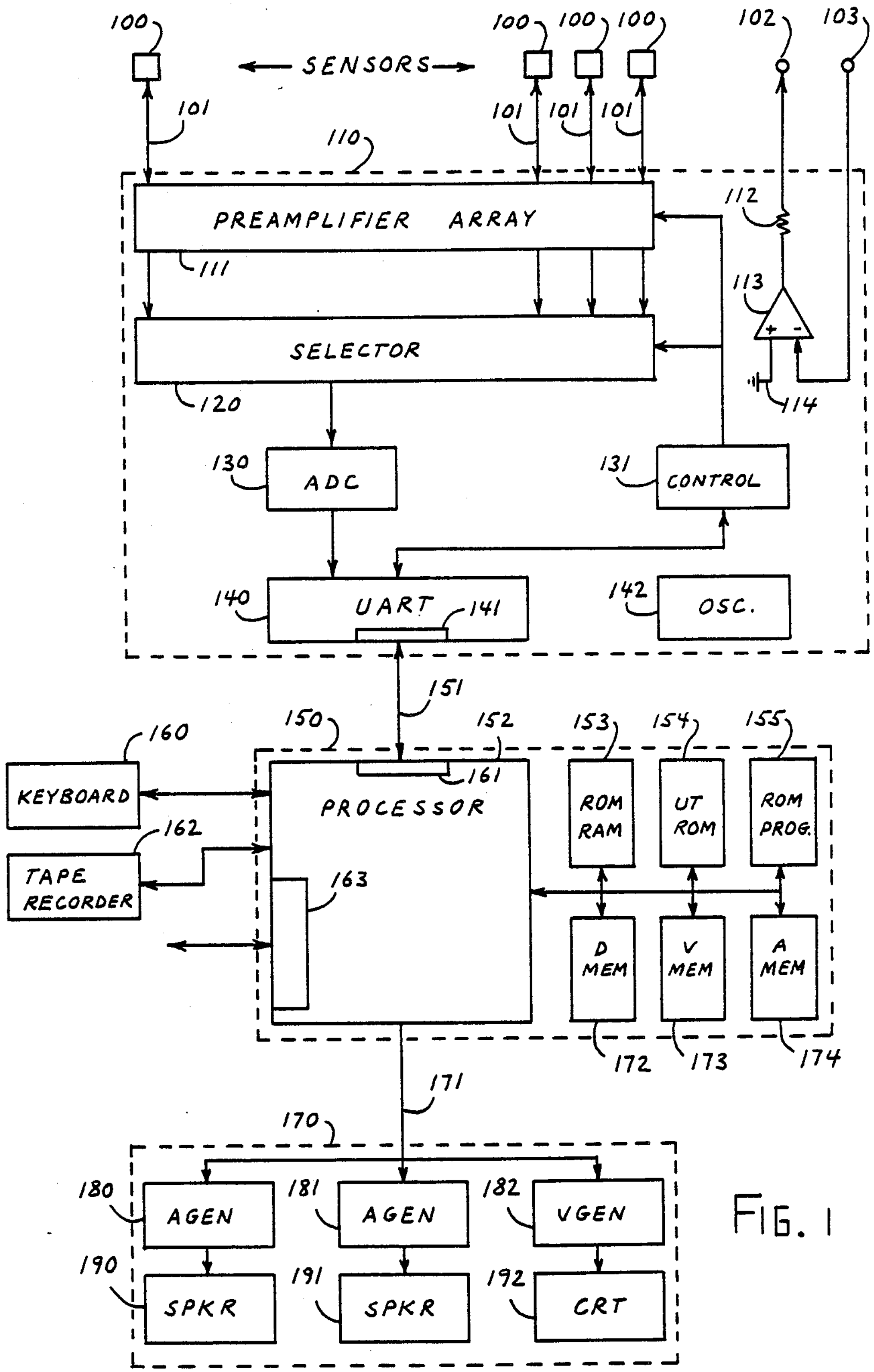
FIG. 1 is a block diagram of the present invention.

FIG. 1 is a block diagram of the universal system of the invention. The system is comprised of three, an interface module functional modules a computer module 110, 150 and a readout 170.

The interface module which is also known as the is located in the immediate physical vicinity of a source of biological or other data to which it is coupled by means of a plurality of sensors 100. Such arrangement is advantageous insofar as it permits the sensor leads 101 to be of minimal lengths so that electrical noise picked up from the environment may be kept at a mininum value.

The sensors 100 are preferably conventional devices for collecting physiological or other data in the form of electrical potentials, electrical impedances, temperatures, forces, pressures, flow rates, etc. It may, moreover, be part of the sensing process to energize or apply electrical potentials to the sensors themselves or the body or other structures to which said sensors are attached or otherwise coupled.

Preamplification array 111 normalizes all sensor data by amplifying and/or otherwise conditioning the outputs of the sensors into electrical voltages whose values fall between pre-defined limits within the operating range of conversion circuits 120 and 130. It is a major object of this invention to organize the whole system of FIG. 1 so that the "front end" analog circuits of preamplifier array 111 may be reduced to their simplest possible configuration containing "but not limited to" a multiplicity of standard circuits such as those illustrated in FIGS. 2, 3, 4, 5, 6 and 7. Relatively complex system functions such as filtering, detection, comparison, sampling, etc. are performed by the computer of module 150 whenever possible.

Selector 120 chooses one of the outputs of preamplification array 111 and feeds the corresponding normalized analog sensor data to ADC (analog to digital converter) 130. ADC 130 in turn translates the analog data into a corresponding digital code, which is then transmitted by means of UART 140 and circuit 141 to computer module 150. UART 140 is a universal, asynchronous receiver/transmitter. In it, a parallel digital "word" descriptive of the value of a given sensor output is translated into its corresponding, serial form and sent via interface 141 to computer module 150. The same UART converts each serial "word" coming from computer module 150 via circuit 141 into a corresponding parallel "word" denoting an address for selector 120 (actually the identity of a sensor) or, more generally, a control instruction for the circuits of interface module 110.

Control circuit 131 is optional in case it is desired to further decode addresses, store control information or otherwise process instructions emanating from computer module 150. Circuit 141 includes optically coupled or other isolators, modems and line drivers and receivers, singly or in combination, or like means for the proper conditioning and isolation of both outgoing and incoming digital data. Circuit 142 is an oscillator which provides clock reference signals as required by the various circuits contained in interface module 110.

Last but not least, the circuit of operational amplifier 113 and resistor 112 is used to actively control the ground or background potential of the body or structure to which sensors 100 are attached. Leads 102 and 103 may be tied together or at two different locations of said body or structure. Lead 102 is the active lead, and lead 103 the sensing lead. Lead 103 senses any deviation in the potential of said body or structure from that of the analog reference ground 114. Said deviation is then amplified and its polarity reversed in amplifier 113, after which it is re-applied to said body or structure, thereby cancelling all voltages picked up by said body or structure acting as an antenna, notably AC "hum" from nearby electrical apparatus or power lines. Resistor 112 prevents damage to amplifier 113 when lead 102 is shorted to ground or any other low impedance voltage source by limiting the maximum value of the current that is allowed to flow.

The use of an active ground reference point as described contributes significantly to this invention in that it reduces the amplitude of the unwanted electrical signals (or "noise ") picked up by the sensors. As a consequence, filtering means can be omitted from array 111. Filtering can instead be done later using computer algorithmic methods. The resulting savings in the complexity and cost of array 111 and the system in general are quite significant.

FIGS. 2, 3, 4, 5, 6 and 7 illustrate a number of specific electronic circuits and methods that have in common the fact that they are useful electronic building blocks. Said building blocks are mostly used in preamplification array 111 and represent the mininum that may be needed in the way of analog circuits for each sensor in the system of this invention, where the emphasis is on digital methods. The manner of use and interconnection of said blocks to form the preamplification array 111 will be readily apparent to those skilled in the electronics art.

Figure 2:
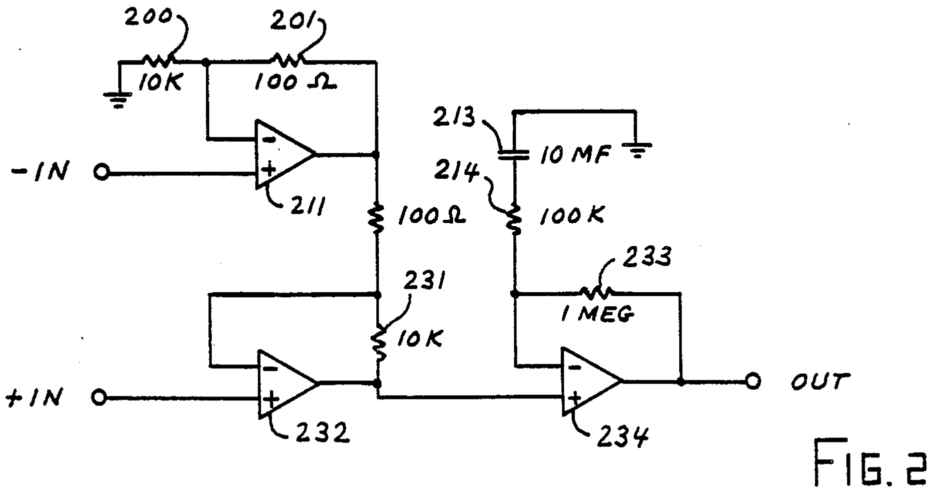
FIGS. 2, 3, 4, 5, 6 and 7 are schematic circuit diagrams which illustrate examples of analog electronic circuits which can be used as building blocks in preamplifier array 111 of FIG. 1 and in other circuits of this invention.

FIG. 2 illustrates a simplified yet very effective biological amplifier suitable for EEG measurements. The circuit of op-amps 211 and 232 constitutes a high input impedance differential amplifier with a gain of 100. The resistance values of resistors 200 and 231 must be matched to insure a high CMRR (Common made rejection ratio). The same is true for resistors 201 and 212. The circuit of op-amp 234 has an AC gain of 10 and a DC gain of unity because of the inclusion of capacitor 213 in series with resistor 214.

Figure 3:
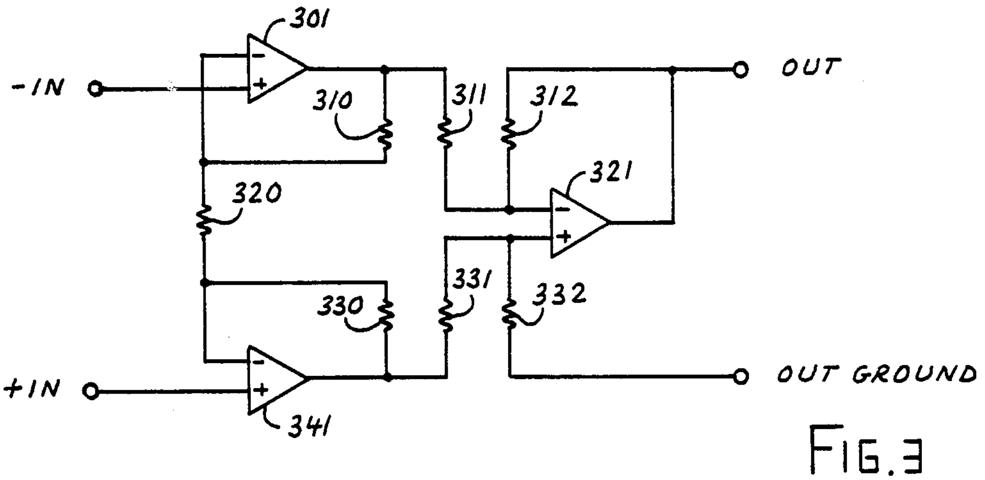

FIG. 3 illustrates the classic "Instrumentation Amplifier." It is a circuit that goes a long way to reproduce the characteristics of the ideal operational amplifier. It is widely encountered in instrumentation systems and many versions can be purchased in the form of integrated circuits. Op-amps 301 and 341 form a high input impedance differential gain stage whose gain depends on the resistance values of resistor 310, 320 and 330. Resistors 310 and 330 have the same value. To adjust the gain of the differential amplifier it is only necessary to change the resistance value of resistor 320. The final stage consists of amplifier 321 and resistors 311, 312, 331 and 332. The resistance value of resistor 311 must accurately match that of resistor 331, and that of resistor 312 must match that of resistor 332 respectively for good CMRR. Gain is changed by adjusting the ratio between the resistance of resistors 312 and 311, and 332 and 331, respectively.

Figure 4:
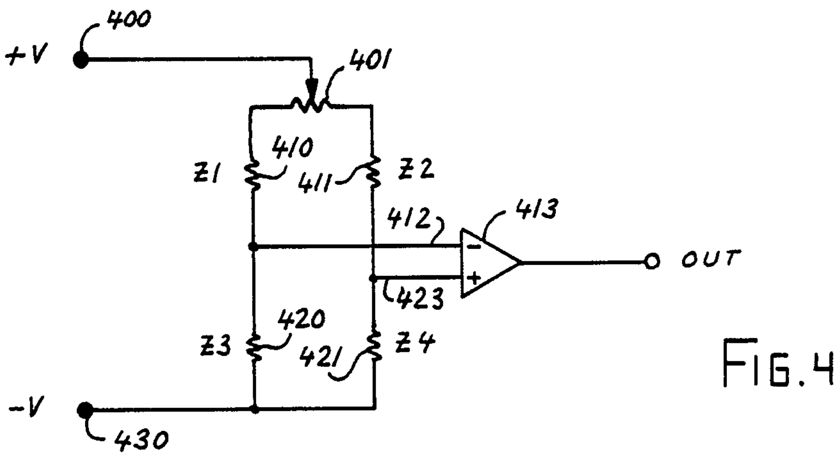

FIG. 4 shows how instrumentation amplifier 413 may be used in sensitive impedance measurements. Amplifier 413 may be the same as the instrumentation amplifier of FIG. 3. Potentiometer 401 is used to balance a bridge consisting of impedances 410 (Z1), 411 (Z2), 420 (Z3), and 412 (Z4). A sensor can be substituted in place of any said four impedances. Any change in impedance of said sensor results in a corresponding voltage difference between inputs 412 and 423 of amplifier 413 which then further amplifies the signal.

In most instances where a sensor is used to measure impedances, one must take into account the fact that an electrochemical interface may exist. This interface can occur between an electrode and a biological or other surface covered by, permeated by or consisting of a fluid or other mixture. Said interface can act as an electrolyte, thereby forming a battery with the electrodes of the sensor.

When an electric current flows through the sensor electrodes it "charges" the above-mentioned battery. Electrolysis occurs, gas bubbles accumulate on the surfaces of the electrodes and a counter-e.m.f. is established. This effect causes the sensor to behave as if it was an impedance involving one or more (fairly large) capacitors.

From the point of view of safety, accuracy and efficiency it is undesirable to cause uncontrolled electric currents to flow through the electrodes of the sensors. These currents are therefore kept small, and, in most instances, their direction is periodically reversed in order to cancel polarizing effects and electrolysis.

In the preferred embodiment the excitation source (+V and −V) applied between terminals 400 and 430 is coupled through a capacitor (not shown) and energized only when the computer selects the corresponding data channel. Said capacitor insures that the net current through the sensor electrodes is zero. Of course, instead of a capacitor, a transformer could also be used to couple the excitation source. Because it is the computer that takes care of energizing the impedance bridge, the usual AC source used to energize the bridge is avoided, as is the detector which usually must follow the instrumentation amplifier 413.

Energizing currents can be kept small by carefully choosing the values of impedances 410, 411, 420 and 421 (i.e., Zl, Z2, Z3 and Z4).

Figure 5:
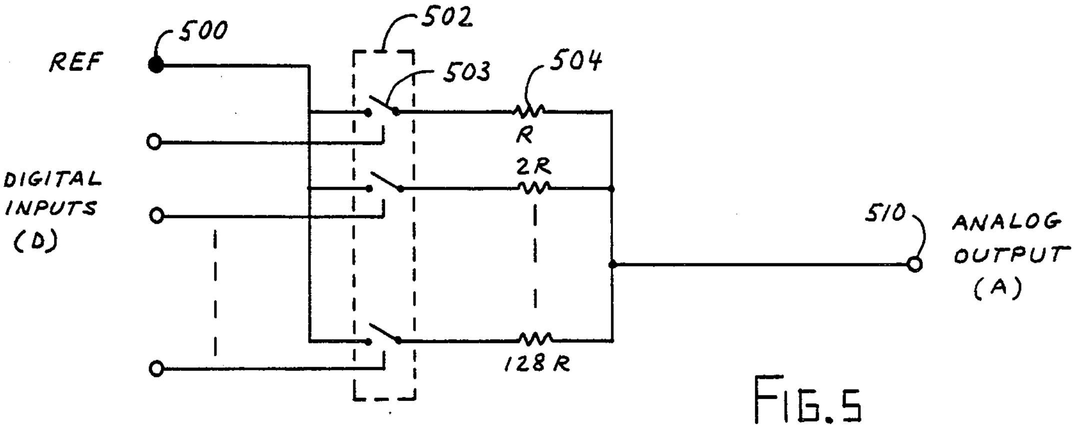

FIG. 5 shows how a digitally controlled resistance may be achieved using array 502 of digitally controlled CMOS analog switches 503 together with an array of resistors 504. When the resistance values of resistors 504 are chosen to be R, 2R, 4R, 8R, 16R, 32R, 64R and 128R, 256 different discrete current levels can be made to flow from the reference voltage input 500 to the output terminal 510. This is one version of what is known in the art as a multiplying DAC (digital to analog converter) because the output current is also proportional to the voltage difference between terminals 500 and 510.

Figure 6:
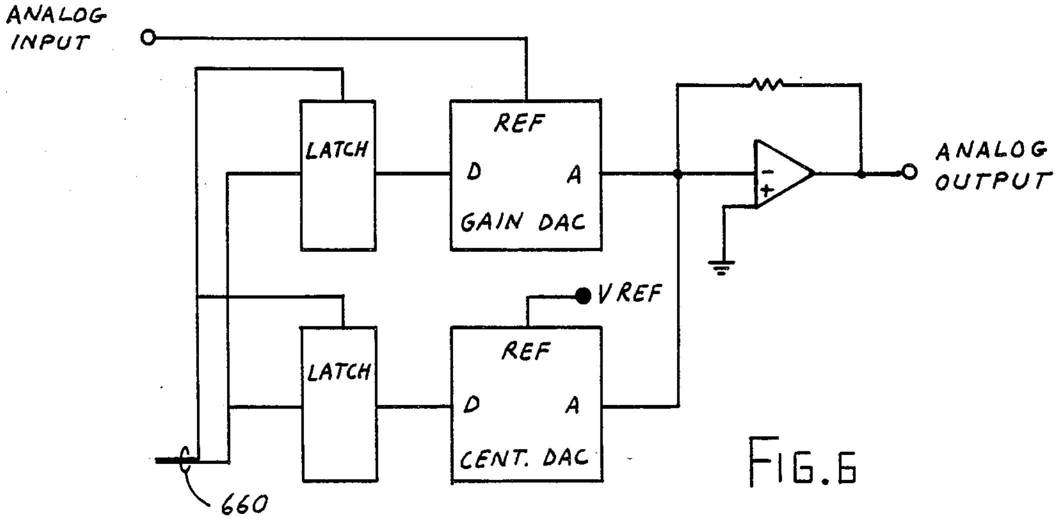

FIG. 6 shows how the DAC of FIG. 5 can be used to replace resistors in a standard amplifier configuration in order to control both gain and offset in response to digital control signals from digital bus 660. The same method can be used to control the gain of the instrumentation amplifier of FIG. 3. In FIG. 3 it is resistor 320 that is replaced by the DAC. One can actually buy integrated instrumentation amplifiers featuring a similar digital control of gain. The above methods are very useful in implementing the kind of controls that may be called for in FIG. 1 in regard to preamplifier array 111. Further, the use of digital computer control in conjunction with an array 111 comprised of the referenced building blocks provides an extremely flexible system in which essential circuit parameters may be easily and programmably adjusted and changed to achieve numerous advantageous system configurations and uses.

Figure 7:
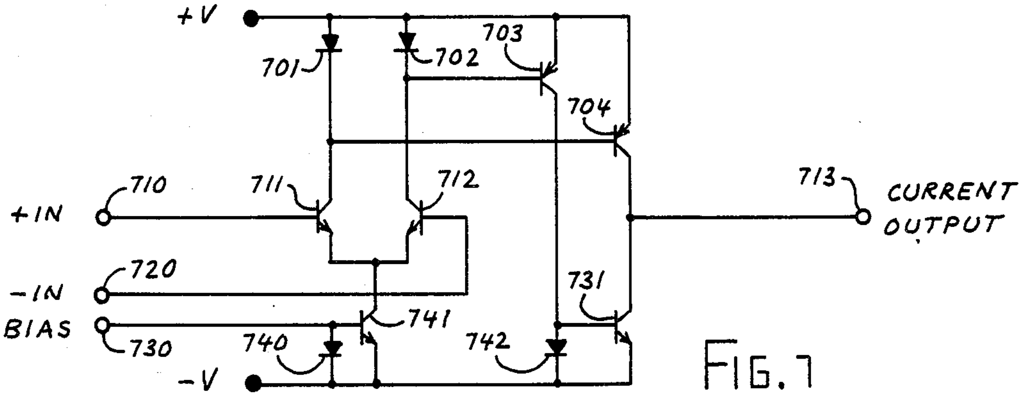

FIG. 7 is a simplified schematic diagram of an OTA (Operational Transconductance Amplifier).

The OTA is a rather unique device, also presently available commercially in integrated circuit form, singly or in arrays of two or three per package.

The OTA converts an input voltage, applied to terminals 710 and 720, into an output current at terminal 713. The magnitude of the output current is also proportional to the bias current injected into terminal 730.

Transistors 711 and 712 constitute a differential amplifier pair, with transistor 741 being the current source.

Diode 740 and transistor 741 constitute a current mirror in which the forward voltage drop in diode 740 matches that of the base-emitter junction in transistor 741 for the same current. When current is made to flow through diode 740 in the forward direction, it developes across it a voltage such that it causes the same amount of collector to base current to flow in transistor 741.

As a result the current from the collector of transistor 741 is equal to the bias current injected into terminal 730.

Transistors 711 and 712 divide the current from the collector of transistor 741 in a ratio dependant on the voltage difference across input terminals 710 and 720. If input 710 is more positive, more of the current will flow through transistor 711, and if input 720 is more positive, more of the current will flow through transistor 712.

The current from the collector of transistor 711 is reflected to the output terminal by means of a current mirror comprised of diode 701 and transistor 704 and results in a positive, or sourcing current at terminal 713.

The current from the collector of transistor 712 is reflected to the output terminal by means of two current mirrors, one comprised of diode 702 and transistor 703 and the other comprised of diode 742 and transistor 731. The current from the collector of transistor 712 thus results in a negative, or sinking current at terminal 713.

When the voltage between inputs 710 and 720 is zero, the current flowing into or out of output 713 is zero also. When the voltage across the inputs is greater than needed to fully turn off either transistor 711 or transistor 712, output 713 is (basically) equal to the bias current and flows out of or into output 713, depending on whether it is terminal 710 or terminal 720 that is more positive.

The OTA is remarkable in that it contains only active components, i.e. transistors and diodes. It can be used as a simple and inexpensive multiplier and its high output impedance is useful in a number of applications requiring high-impedance current sources.

Referring again to FIG. 1, serial digital link 151 is used between interface module 110 and computer module 150, and is such that data flows in two directions, i.e. from circuit 141 to circuit 161, and vice-versa, as was already explained in regard to UART 140.

Processor 152 is the heart of the computer. It includes one or more interdependent microprocessors arranged into a functional hierarchy defined by the required tasks that are, in turn, defined by predesignated memory areas, (discussed below). Provision is made for external connections to a tape recorder or other data storage device 162 and to a microterminal 160 or other means of entering data that includes a keyboard. I.0. ports 163 make it possible for the computer to interface with a variety of peripherals and external data bases.

It is a significant feature of this invention that the organization of computer module 150 is characterized by its use of specific memory areas 153, 154, 155, 172, 173, 174, each corresponding to a well-defined software interface. Each of these memory areas defines a processing level or task that may or may not require a dedicated microprocessor of the processor 152. When more than one microprocessor is used a memory that is properly situated within the architecture additionally functions as a data exchange point between them. (i.e. a software buffer). By reserving an area of memory exclusively for such data exchange, it may be assured that inadvertent entry of data into an area reserved for programs will not occur. Further, throughout this description, it will be evident to those skilled in the data processing arts that this system architecture facilitates otherwise complex programming tasks by allowing the organization of extremely complex programming processes into a number of straightforward component processes performed in physically insulated portions of the system hardware.

Memory block 153 is the usual complement of general purpose ROM and RAM memories.

Memory block 154 is a utility ROM which contains a number of routines that are generally useful for software control, maintenance and program development. Thus a user can call on specific programs or simply inspect the contents of memory, write into memory, read data stored on tape into the system, store the contents of memory on tape or EPROM, etc. Said routines can also include assemblers, compilers and other software development and debugging aids.

Memory block 155 consists of a ROMPR (EPROM Programming Module). It operates the same way as a RAM in that data can be read in or out. However, data can be read in only once, as it is permanently stored (i.e., in a non-volatile way). ROMPR 155 can also be used under the control of software in UTROM 154 to store data or programs in EPROMs. Said EPROMs can then later be plugged into sockets located in the general area reserved for ROM/RAM 153.

Memory 172 (DMEM) is a RAM in which is stored sensor data as it streams in from interface module 110.

Memory 173 (VMEM) is a RAM where vector end point coordinates and other pertinent parameters are stored for the generation of line drawings on the screen of a CRT.

Memory 174 (AMEM) is a RAM in which are stored pitch, duration and other parameters pertinent to the generation of sounds and melodies.

Data is entered in DMEM 172, VMEM 173 and AMEM 174 according to a predetermined format which does not change and thus allows for the improvement or even redesign of selected blocks of hardware with little or no effect on the design of hardware or software in other areas. For instance, vector data as stored in VMEM 173 can be used to generate color pictures on one type of video display or black and white on another. In both cases, the same data format is used.

It is important that the said data formats be such that the information in memories 172, 173 and 174 describe situations and intended results rather than specific algorithmic steps or hardware control commands. For instance, information in DMEM 172 describes sensor outputs rather than instructions for the computer; information in VMEM 173 describes coordinates, color and intensity of line segments rather than control signals for gates, integrators and other circuit elements; information in AMEM 174 describes pitch, duration, intensity and timbre rather than preset values for timers, etc.

The modular aspect of software is illustrated by the fact that the main program used to analyze, correlate or otherwise process sensor information need not allocate time and other resources to hardware control. A special, powerful microprocessor or, perhaps better yet, two or more of the same kind can be added at a later date if necessary to run this main program exclusively and expand on its scope so as to include artificial intelligence. A change in the main program or processor need not require a change in the others, and vice-versa. Even programming languages need not be the same, or even compatible.

Perhaps the most important objective behind the organization of the system has to do with synergism. The various hardware and software modules are mutually enhancing. The computer has more direct access to and control over the sensors and, as a result of a careful categorization of tasks in terms of hardware and software, cost and complexity have been reduced to a minimum. Functions that are best performed with the help of digital algorithms include but are not limited to filtering (especially low frequency, high order filtering), detection, comparison, recognition, linearization, shaping, low frequency adjustments (like gain and offset), coding and sequencing.

On the other hand, functions that are best performed using hardware methods include but are not limited to the generation of continuous line segments and the positioning of images on the screen of a CRT, the generation of audio and other high-frequency waveforms, audio volume control, high-frequency feedback loopsand, last but not least, timing of events.

It is precisely because it de-emphasizes the complexity of the sensors and the individual circuits associated with them that the system of this invention can accommodate a greater number of them.

An important concept in the design of the computer is that of a "body image ". Using sensor information as clues to the physical or mental state of a single individual, organism or apparatus while at the same time drawing on a body of previous knowledge, the computer can arrive at advanced conclusions and representations. These can be summarized in a simple but complete statement or picture. This statement or picture is none other than the "body image" previously mentioned. The use of the most powerful or popular processor is not necessarily desirable. In fact, certain specialized computational or other tasks are best done by means of integrated cricuit modules. An example is a monolithic LSI device that would provide high-performance fixed and floating point arithmetic and floating point trigonometric operations, and which would be handled by the associated processor either using conventional I/O or by direct memory access methods. The advantage of separate, specialized algorithmic modules may be even more evident in tasks requiring the manipulation of very long digital words (32 bits is a good example). The ability to process long words is an important asset in the kind of programming known as artificial intelligence. Artificial intelligence tasks typically require the ability to assemble, modify and compare long lists of descriptors.

There is also a tradeoff between the power of the processor and the extent and amount of pre-computed data available from lookup tables in ROM.

Last but not least, two or more lower power processors, working asynchronously but able to communicate via memory interfaces, provide a superior combination when cost allows..Memories 172, 173 and 174 are examples of memory blocks that can be used as interfaces between processors. Of course, FIFO (First In, First Out) memories can also be used. Bit-slice processors, operating in synchronism, are considered less desirable because of their timing problems. These worsen rapidly with the size and complexity of the system.

Optimum choice of type and number of microprocessors paves the way for easy programming at all levels. At the assembly level, the instruction set can be limited so as to be more manageable. At a higher level, tasks can be identified and called for by name. The result is reminiscent of the methods used for programming electronic calculators in which there is no syntax to worry about and where tasks are performed in a sequence that corresponds to a simple list of names (or keys, in the case of the calculator).

It is of interest to note that in at least one artificial intelligence programming language, simple instructions can be called to operate on assemblages that include data and/or some of the same instructions. Such a language operates the same way whether on a microscopic or macroscopic level. Hence the need to preserve characteristics such as reentrancy and recursiveness. These characteristics can be anticipated in the design of the utility program or programs, notably in regard to the internal procedures for calling subroutines, preserving internal machine states and handling interrupts.

Returning to FIG. 1, module 170 is the readout module.

In order to fully communicate the completed "body image" to a human observer, the readouts must be capable of generating complex yet intelligible pictures and sounds.

In the preferred embodiment, readout module 170 contains a CRT 192 and its associated vector generator VGEN 182, and two loudspeakers SPKR 190 and 191 with their associated audio generators 180 and 181.

Regarding CRT 192, a 5 inch screen is large enough due to the fact that the images generated are made up of sharp, interconnected straight line segments. This is because VGEN 182 is what is known in the art both as a stroke writer and a vector generator. Said vector generator works by moving the spot generated by the electron beam on the screen of a CRT in the same way that a hand moves the point of a pencil when drawing on a piece of paper. The electron beam does not scan the screen in a fixed pattern (known as a raster) as in television.

Rather, it moves in a random pattern, like the electron beam in an oscilloscope in the X-Y mode of deflection. Indeed, an inexpensive X-Y oscilloscope can be used in place of CRT display 192 with good results.

It is important for the success of this invention to fully realize the advantages of a vector generator.

The vector generator is not, as often beleived, an expensive and cumbersome solution. This reputation comes from the early days of CAD CAM before the technology had matured.

In the case of the vector generator, power consumption, cost, complexity and memory requirements tend to be proportional to the total number of vectors displayable at any one time. In the case of the raster scan generator, power consumption, cost, complexity and memory requirements increase exponentially with picture resolution. As far as CRT parameters are concerned, light output and resolution are much more critical in raster scan applications.

Display memory, in particular, is affected by the choice of display generation method. With a raster scan, each pixel or picture element corresponds to one or more bits in digital RAM. There are approximately 250,000 pixels in a standard television picture, and the corresponding digital bit or bits must be stored and read out at very high rates. Yet, with as many as 250,000 pixels, slanted lines still appear as stair-cases, circles appear jagged and alphanumeric characters tend to look blurred. The effect is easier to understand if one considers that a television picture is in effect a mosaic, and each pixel the equivalent of a single tile in that mosaic.

With a vector or random scan, each vector or line segment is represented by the X and Y coordinates of its end point, plus some information as to color and intensity. The starting point of a vector is already available as the end point of the previous one. The corresponding memory requirement varies from 16 to 32 bits per vector. For a busy display with 1000 vectors, a total of 16,000 to 32,000 bits is required. This is nearly ten times less than the requirement for raster scan.

The main limitation of the random or vector scan is that it is the total number of vectors which is limited. This is significant because circles, alphanumeric characters and "filled" areas use a lot of vectors.

State-of-the-art, low cost vector CRT displays are now used in airplane cockpits to replace conventional readouts. One of the most important reasons for using vectors is that all lines appear sharp and clear, even in dynamic displays where the position and angle of each line is subject to change. Dynamic raster scan displays have been rejected because their lines often appear jagged, with or without running discontinuities. The effect is, to say the least, distracting.

Avionics CRT displays also demonstrate the superiority of vector techniques when it comes to generating complex color pictures showing artificial horizons, trajectories, compass rosettes, alphanumeric characters and other shapes and symbols in various combinations—all at a reasonable cost.

This invention favors the vector generator for yet another, more subtle reason.

It is known that the human brain recognizes shapes based on the lines that define their borders. The quality of these lines is thus very significant. Experience gained with computer video games confirm that random scan displays are better able to convey movement and perspective.

Figure 8A:
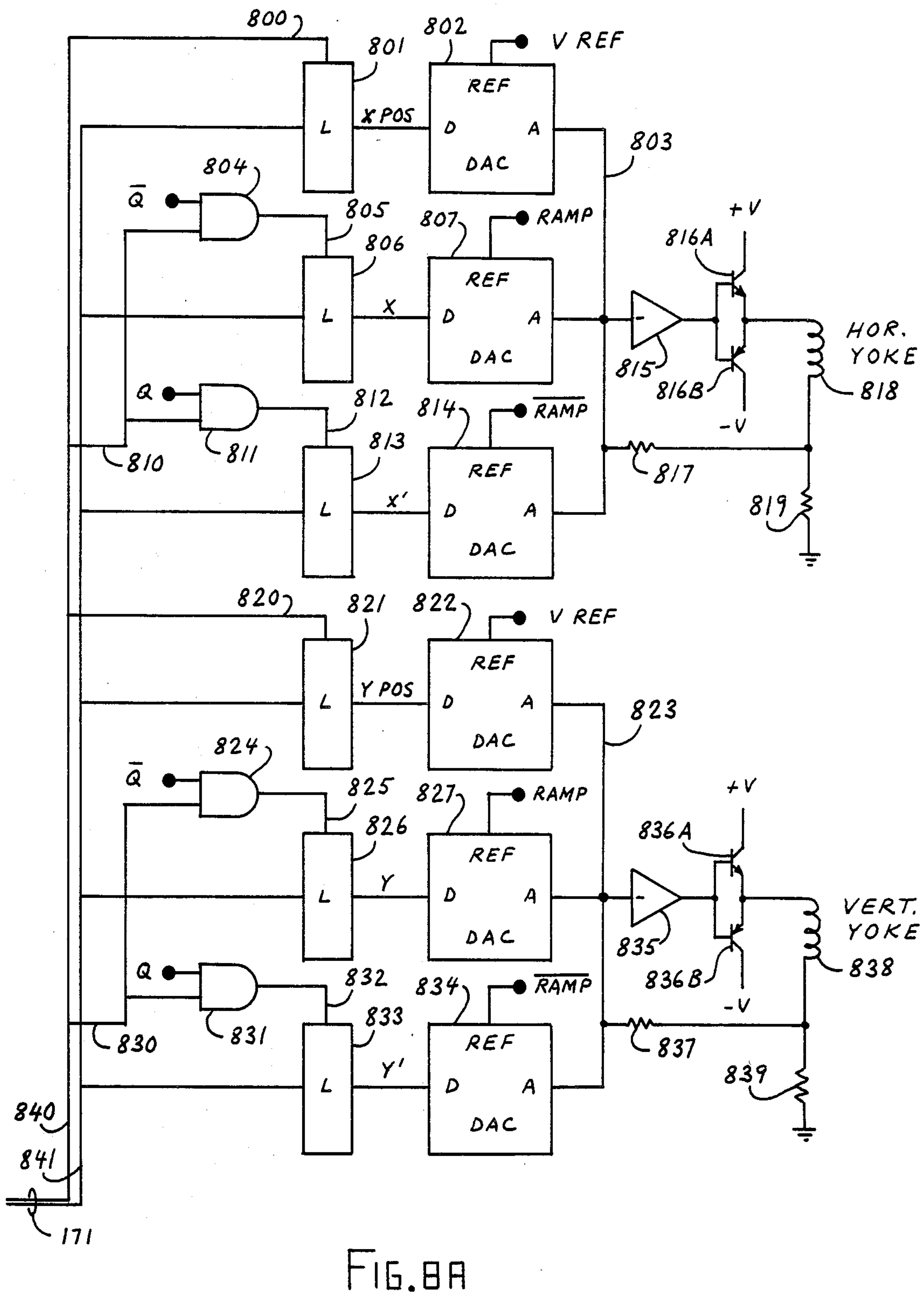
FIGS. 8A and 8B constitute a simplified schematic circuit diagram of the vector generator 182.
Figure 8B:
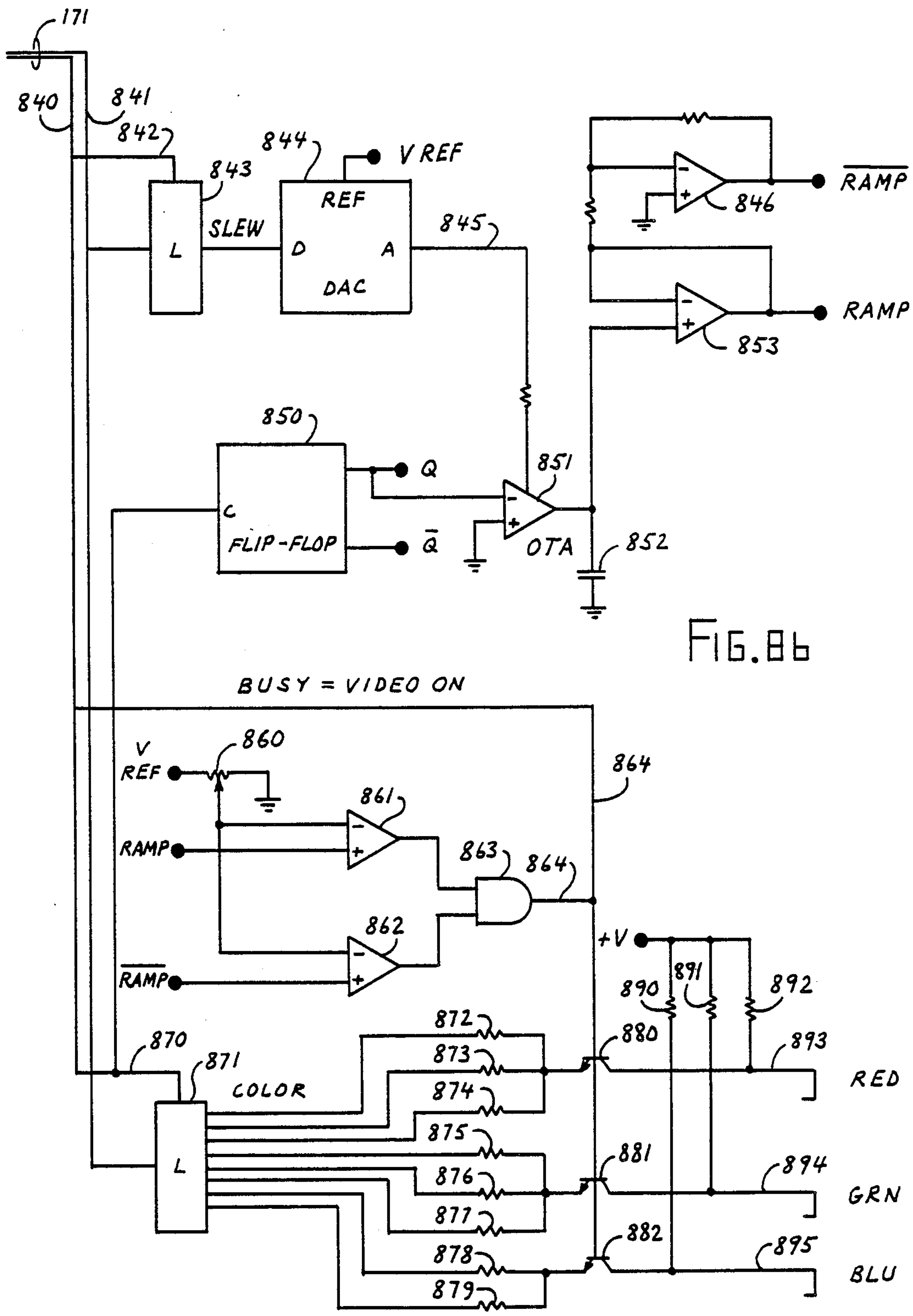

Since the circuitry used to generate the vectors has a major impact on the cost and quality of the display, a preferred embodiment is included as a part to this invention relating to the circuits of which VGEN 182 is comprised. These circuits are illustrated in FIGS. 8A and 8B and are described in what follows.

In theory, the digital circuits associated with the CRT display generate a succession of numbers which correspond to dots on the screen. The placement of each dot is defined by an X and a Y coordinate, each typically represented by an 8-bit binary digital number. The role of the analog circuits of the vector generator is to draw lines between these dots.

The vector generator of this invention generates both an X and a Y analog deflection waveform, each having the appearance of a series of interconnected ramp functions of variable amplitude and duration. When an X or Y digital coordinate is changed, the corresponding analog output is not allowed to suddenly jump to its new value, as would be the case in a standard DAC. Instead, the transition from one analog level to the next occurs progressively, in a controlled manner. This idea is not new; see for instance, U.S. Pat. No. 3,609,444 issued to Raymond C. Van den Heuvel. What is new in the vector generator of this invention is a combination of circuits that makes it possible to control the time that it takes for an analog output to change from one level to another. The result is that very short and very long vectors can be accommodated equally well by the same circuit.

The basic process can be explained by describing the operation of the circuit combination that includes latches 806 and 813, DACs 807 and 814 and amplifier 815, all of which are involved with deflection along the horizontal, or X axis. The analog outputs from DACs 807 and 814 are tied together to summing bus 803, which is the negative input of amplifier 815 and constitutes a virtual ground.

This virtual ground is the input of a deflection amplifier with a negative feedback loop such that the current that flows through deflection yoke 818 is proportional to the sum of the individual currents that are injected into summing bus 803. The deflection amplifier itself consists of high-gain, high bandwidth amplifier 815 followed by a power stage consisting of transistors 816A and 816B. The current flowing through deflection yoke 818 also flows through resistor 819, which has a low value of resistance and very low inductance. The voltage drop across resistor 819 is therefore proportional to the current flowing through yoke 818 and causes a current to flow through feedback resistor 817 in a direction and amount sufficient to cancel the contribution of all other current sources connected to summing bus 803. The negative feedback loop thus implemented also guarantees that the electron beam will move with the desired accuracy on the screen of the CRT.

Now assume that the RAMP input to DAC 807 is stable at its maximum value, and that the $\overline{\text{RAMP}}$ input to DAC 814 is stable at zero volts (i.e., deenergized). Assume, further, that an X coordinate of origin is available (in digital form) from the output of latch 806 and that an X coordinate of destination is available (also in digital form) from the output of latch 813. Since only DAC 807 has a reference signal, it alone contributes to the value of the current flowing through the yoke. This corresponds to a stable point of origin on the screen, which soley represents the digital number stored in latch 806. If, on the other hand, the situation was reversed, with DAC 814 energized and DAC 807 de-energized, the current flowing through the yoke would correspond to a stable point of destination solely representative of the digital number in latch 813.

The vector generator of this invention makes it possible to generate intermediate values of RAMP and $\overline{\text{RAMP}}$ voltages such that when RAMP is maximum, $\overline{\text{RAMP}}$ is mininum (or zero, as in this example) and vice-versa. Furthermore, RAMP and $\overline{\text{RAMP}}$ change in opposite directions, so that when RAMP increases linearly in a positive direction, $\overline{\text{RAMP}}$ increases linearly in a negative direction, and vice-versa. (Actually $\overline{\text{RAMP}}$ is the negative of RAMP, as will be seen later.)

Returning to the limited configuration being used to illustrate the principle of operation of the vector generator, assume that the value of RAMP voltage starts to decrease, and that the value of $\overline{\text{RAMP}}$ voltage starts to increase. The result is that the contribution of DAC 807 decreases in the same proportion, while that of DAC 814 increases, also in the same proportion. At the midpoint in the transition, when RAMP is equal to $\overline{\text{RAMP}}$, the current flowing through the deflection yoke is also half-way between the values it would take if either DAC 807 or DAC 814 were fully energized. In a more general way, it can be said that while the destination DAC 814 is linearly energized and the origin DAC 807 linearly de-energized, the electron beam also moves linearly between its original and final positions.

The same consideration would apply if latches 826 and 833, DACs 827 and 834 and amplifier 835 had been used as in the previous example, except that, in this case, the Y or vertical axis of deflection is involved. When both X and Y axes are considered simultaneously, the progressive decrease of the RAMP voltage and the concomitant increase in $\overline{\text{RAMP}}$ voltage will cause a straight line or vector to be drawn on the screen such that it connects a point of origin with coordinates X and Y with a point of destination with coordinates X' and Y'. If a new set of coordinates is then loaded into latches 806 and 826, and the RAMP voltage is then linearly increased in a positive direction while the $\overline{\text{RAMP}}$ voltage is correspondingly decreased, a second vector is drawn on the screen connecting the end point of the last vector with coordinates X' and Y' to a new point whose coordinates are those most recently stored in latches 806 and 826. The next step is to load the next X and Y coordinates in latches 813 and 833, followed by another transition of the RAMP and $\overline{\text{RAMP}}$ voltages causing a third vector to be drawn, and so on.

The circuit of latch 801 and DAC 802 is used to inject a constant current offset into summing bus 803 and the circuit of latch 821 and DAC 822 does the same for summing bus 823. This combined X and Y offset modifies the position of the vectors that are generated after it so that it is possible to move symbols, characters or lines to a different location anywhere on the screen without having to recompute the X and Y coordinates of the vectors involved. The savings in terms of computation time can be significant.

Referring to FIG. 8B, latch 843 stores a digital binary number that represents the SLEW rate or speed at which the RAMP and $\overline{\text{RAMP}}$ signals must change. If said binary number is small, RAMP and $\overline{\text{RAMP}}$ will take a long time to change from mininum to maximum, and vice-versa. If it is large, the transition will take a short time.

DAC 844 converts the SLEW rate digital signal into an equivalent analog voltage. This voltage is used as a bias source for OTA 851.

OTA 851 is a special kind of operational amplifier known as an operational transconductance amplifier. The detailed, internal construction of an OTA is illustrated on FIG. 7, and has already been described previously in conjunction with the circuits used in array 111. OTA 851 is used as a variable current source to charge capacitor 852. The voltage across capacitor 852 increases with a speed proportional to the SLEW signal and in a direction dependent on the polarity of output Q of flip-flop 850. Op-amp 853 is used as a voltage follower and its output is the RAMP signal described earlier. The $\overline{\text{RAMP}}$ signal is obtained at the output of inverting amplifier 846.

Flip-flop 850 changes state at the start of each new vector generation cycle. Its clock input is connected to the clock or strobe line of the last latch to be loaded by computer 150. Before changing state, its $\overline{\text{Q}}$ and Q outputs are used to steer the X coordinates either into latch 806 or latch 813, and the Y coordinate either into latch 826 or latch 833, whichever is appropriate. A soon as flip-flop 850 changes state, the voltage across capacitor 852 also starts to change, and with it, the RAMP and $\overline{\text{RAMP}}$ voltages, all three voltage changes being progressive and linear.

Latch 871 stores a binary digit representative of color and/or intensity. Three of its outputs are directly connected by means of resistors 872, 873 and 874 to the emitter of transistor 880. Three more are connected through resistors 875, 876 and 877 to the emitter of transistor 881. The remaining two outputs are connected through resistors 878 and 879 to the emitter of transistor 882. Transistors 880, 881 and 882 are video transistors and their collectors are connected to the red, green and blue cathodes 893, 894 and 895 of color CRT 192 (FIG. 1). If a black and white CRT is used (with only one electron gun), only one video transistor is used, with all resistors tied to its emitter.

When one of the latch 871 outputs is low (i.e., zero volts) current flows through the resistor connected to it. The magnitude of that current is inversely proportional to the resistance of said resistor. If resistors 872, 873 and 874 have resistance values of R, 2R and 4R, respectively, it is possible to choose between eight possible levels of current, and hence, intensity values for the red gun 893. The same is true for resistors 875, 876 and 877 and green gun 894. Because there are only two resistors, 878 and 879, associated with the blue gun, only four discrete levels of intensity are achievable. (Blue is the least critical color in terms of its intensity because said intensity is hard to judge by the human eye.)

Resistors 890, 891 and 892 represent the load resistors of video transistors 880, 881 and 882 and their associated peaking and biasing circuits (not shown).

The circuit of potentiometer 860, comparators 861 and 862 and AND gate 863 are used to control voltage 864 at the bases of video transistors 880, 881 and 882. When base voltage 864 is positive, the video transistors function as described above, and video is "on ". When that voltage is zero, the video transistors cannot conduct and video is "off".

It will be remembered that the reference value of the RAMP and $\overline{\text{RAMP}}$ voltages is that voltage for which the analog outputs of the DACs correspond to their digital inputs. When the amplitude of the RAMP and $\overline{\text{RAMP}}$ waves exceed the DAC reference value, a longer vector is drawn than called for. However, since the true end point of one vector still coincides with the true start point of the next, it is only necessary to restrict the time that video is turned on to a period during which RAMP and $\overline{\text{RAMP}}$ are within limits. For reasons that will become clear later, it is advantageous to be able to adjust the limiting voltage levels of RAMP and $\overline{\text{RAMP}}$ for which video is turned on.

It is important to the optimum performance of this invention to be able to generate RAMP and $\overline{\text{RAMP}}$ waves whose amplitude is greater than the DAC reference voltage and to be able to adjust potentiometer 860 experimentally so as to arrive at the exact range of RAMP and $\overline{\text{RAMP}}$ voltages for which video must be turned on. As a result of the above combination the electron beam is already moving by the time video is turned on and no bright spots appear at the beginning and end points of the vectors. In practice, potentiometer 860 is adjusted so as to close the gaps that tend to open up between vectors as a result of time delays in the deflection circuits.

Voltage 864 essentially defines the time video is on, i.e. the time period during which a vector is both displayed and displayable. It can thus also be used to alert the computer of a vector generator BUSY condition.

For voltage 864 to be positive, it is necessary for the outputs of comparators 861 and 862 to be positive at the same time. This, in turn, requires that the RAMP and $\overline{\text{RAMP}}$ voltages both be less than the voltage at the wiper arm of potentiometer 860. In other words, a vector is visible on the screen only when the RAMP and $\overline{\text{RAMP}}$ voltages are changing and have a value less than the maximum set by potentiometer 860.

The digital information loaded in the latches of FIGS. 8A and 8B comes from VMEM 173 via digital bus 171 (FIG. 1).

Digital bus 171 is comprised of a data bus 841 and a control bus 840. The data bus is 8 bits wide in the preferred embodiment and is routed to latches 801, 806, 813, 821, 826, 833, 843 and 871. The control bus includes lines 800, 810, 820, 830, 842 and 870 used by processor 152 to select the destination of the X, Y, SLEW and COLOR (or INTENSITY) data being sent on data bus 841. The control bus also includes a BUSY line by means of which the vector generator alerts the CPU of its status. This BUSY signal is sent to processor 152 by means of line 864, which also happens to be an extension of the "video on" line.

The X selection signal at line 810 is AND-ed with the $\overline{Q}$ of flip-flop 850 to select latch 806 in the case of odd-numbered vectors, and with the $\overline{Q}$ output to select latch 813 in the case of even-numbered vectors. Similarly, the Y selection signal at line 830 is AND-ed with the $\overline{Q}$ output of flip-flop 850 to select latch 826 in the case of odd-numbered vectors, and with the Q output to select latch 833 in the case of even-numbered vectors.

In the preferred embodiment, the order in which vector data is stored in VMEM 173 is the same as the order in which computer 150 outputs the data to the latches.

Before a sequence of vectors is generated, the X and Y positioning coordinates are loaded into latches 801 and 821. As has been mentioned before, this action determines the position of an object, symbol or other group of vectors relative to the center of the CRT screen.

While the vectors are being generated, coordinates are loaded alternately into the X and Y latches (case of the odd-numbered vectors) and into the X' and Y' latches (case of the even-numbered vectors), back and forth. The RAMP and $\overline{\text{RAMP}}$ voltages form two triangular waves of opposite polarity and varying periods. The RAMP wave increases during the generation of odd-numbered vectors, and the $\overline{\text{RAMP}}$ wave decreases at the same time. The situation is reversed during the generation of even-numbered vectors.

Flip-flop 850 keeps track of the odd and even cycles. Its status changes first before the onset of a vector cycle.

The generation of an odd vector begins with the Q output of flip-flop 850 false or zero. Data is loaded in the latches according to the following sequence: X, Y, SLEW and finally COLOR (or INTENSITY). Line 870, used to select latch 871, is also used to signal flip-flop 850 when digital data has been loaded prior to the generation of a new vector. As a result, the polarity of Q changes to a positive value and the RAMP voltage begins to increase in a positive direction while the $\overline{\text{RAMP}}$ voltage begins to decrease toward zero or a negative value and the electron beam begins to move. As soon as the value of the $\overline{\text{RAMP}}$ voltage becomes less than the voltage at the wiper of potentiometer 860, video is turned on, and, unless the COLOR or intensity data in latch 833 is zero, a luminous trace is generated on the screen. After a time period that is inversely proportional to the SLEW digit stored in latch 843, the amplitude of the RAMP wave exceeds the voltage at the wiper of potentiometer 860 and both BUSY and video signals are turned off.

As soon as the BUSY signal is low or zero, computer 150 begins loading the latches in the same sequence as before. However, due to the fact that the Q output of flip-flop 850 is now true or positive, latches 813 and 833 are loaded with X' and Y' coordinates. When COLOR (or INTENSITY) data is finally entered in latch 871, flip-flop 850 changes state again and its Q output becomes false or zero, the RAMP and RAMP waves change in a negative and positive direction respectively, and an even-numbered vector is generated, after which an odd-numbered vector is generated, and so on, indefinitely.

It is an important feature of this method that the data in the X, Y, X' and Y' DACs changes only when the DACs have their reference voltages equal to zero or a value such that their output does not contribute significantly to the deflection of the electron beam. Indeed, most methods available from prior art involve switching operations at the beginning and/or end of each vector generation cycle. This causes discontinuities in the generation sequence that mostly affect the beginning and end points of the vectors, resulting in faded or intensified line portions, open gaps, bright dots, hooks and other unsightly features.

It is another important feature that, as far as the digital circuits outside the vector generator are concerned, vector information is stored and transferred in the same unvarying order, according to a pre-determined sequence. A typical sequence occurs in the following order: X, Y, SLEW, COLOR, etc. This represents a universal format or protocol that can easily be implemented using any processor or any circuit made up of logic elements.

Figure 9:
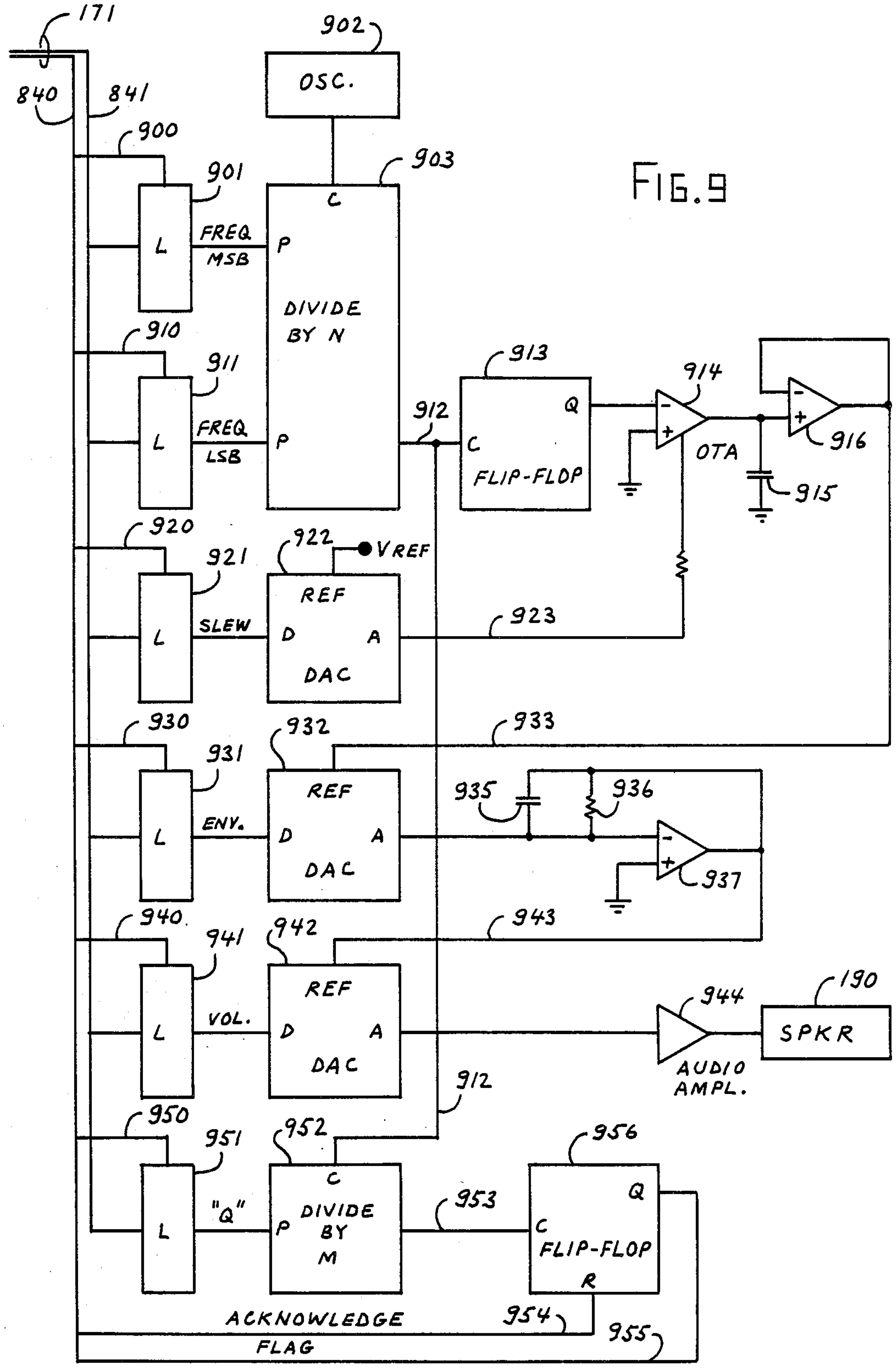
FIG. 9 is a simplified schematic circuit diagram of the sound generators 180 or 181.

FIG. 9 is a simplified schematic circuit diagram of the preferred embodiment for sound generators AGEN 180 or 181.

Sound is an important medium for communication and has its own special advantages as compared to visual presentations. It does not require the kind of attention where body movement is limited and where sense organs are kept trained in a single direction. It is possible to move about or close one's eyes while listening. Perhaps more importantly, the sense of hearing occupies a far smaller volume of the brain than the sense of sight, and consumes a correspondingly smaller amount of nervous energy. Sound is very convenient when it is desired to convey information without causing the intended recipient to be unduly distracted.

It is an important requirement of this invention that the sounds generated by AGEN 180 and 181 be as natural as possible and that the pitch, timbre and envelope features be controllable.

Even though one AGEN is sufficient in many cases, the use of two "voices" greatly enhances the potential for conveying useful information in the form of melodic statements. The main reason is that when two tones are used simultaneously, one of them can act as a reference or counterpoint to the other. Intervals and harmonies convey more information than would be conveyed by each tone considered seperately. Here also, the relationship is synergistic.

Since digital circuits, and hence computers, generate what is called "square waves ", some analog means must be found of generating sine waves, the kind that are prevalent in nature, and analog means must also be found of controlling their volume or intensity without disturbing the phase of the sine wave whenever the amplitude or envelope is changed. Indeed, the ear cannot detect discrete changes in amplitude if they are sufficiently small. However when the phase of a sine wave is suddenly changed, a "click" is perceived.

One might assume that computers are best suited for keeping track of time intervals and synthesizing waves of the desired frequencies. This is only partly true however, because counting and timing tasks tend to exclude a processor from doing other tasks. Computers keep track of time by counting, and the process cannot be interrupted by other tasks without knowing in advance how much time these tasks take to complete. Hence the popularity of programmable counters as peripheral circuits for microprocessors.

Referring again to FIG. 9, the digital information necessary for the generation of sound is sent via digital bus 171 (FIG. 1) to latches 901, 911, 921, 931, 941 and 951. In the preferred embodiment data bus 841 is eight bits wide and is routed to the input of the abovementioned latches. Control bus 840 carries strobe lines 900, 910, 920, 930, 940 and 950 used by computer 150 to select the particular latch for which the information on data bus 841 is intended at a given time.

Latches 901 and 911 store the most significant and least significant bytes (MSB and LSB) of a 16 bit digital number which is used as the preset for DIVIDE BY N circuit 903. This circuit divides the output of OSCILLATOR 902 by the abovementioned preset, thus generating a timing signal that recurs at twice the frequency of the pitch sine wave to be generated. Said timing signal serves as a clock input for flip-flop 913. The output of flip-flop 913 is a square wave at the desired frequency.

OTA 914 is an operational transconductance amplifier similar to that discussed previously and illustrated in FIG. 7. It is used as a programmable current source. The direction of the current is toward capacitor 915 when the Q output of flip-flop 913 is negative, and away from capacitor 915 when Q is positive. The magnitude of the current is commensurate with that injected in the bias input of the OTA and available from output 923 of DAC 922. Bias signal 923 is the analog equivalent of the SLEW signal stored in latch 921 and determines how fast the voltage changes across capacitor 915. As a result, the waveform across capacitor 915 can take on any intermediate shape between a square wave and a triangular wave. Amplifier 916 is a buffer stage configured as a voltage follower.

Square waves are typical of reed instruments and import a "buzzing" quality to the sound. Sine waves are more descriptive of the flute. As far as auditory perception is concerned, triangle waves are close to sine waves and their added harmonic content contributes to a metallic "flavor" reminiscent of bells, chimes and percussion instruments such as the harp and the piano. The percussion effect, which is characterized by a sharp attack and a subsequent exponential decay of the sound envelope has to be added by suitably modulating the amplitude of the wave without, however, modifying its phase, as previously mentioned.

A standard multiplying DAC 932 can be used for this purpose. The voltage at output 934 is the product of the analog waveform at input 933 and the digital number stored in larch 931 which represents the magnitude of the envelope of the sound.

Amplifier 937 amplifies the resulting sound signal. A capacitor 935 can be used alone or added in parallel with feedback resistor 936 in order to filter out the higher harmonics, resulting in waves that more closely resemble sine waves.

A seperate DAC 942 can be used to further control the amplitude of the sound wave in proportion to the magnitude of the binary number stored in latch 941.

The signal stored in latch 941 is referred to as the VOLUME of the sound wave.

The use of two multipliers in series for the control of amplitude reflects the need for a wider total dynamic range than would be possible with a single 8-bit device typical of the preferred embodiment. Of course, a single 16-bit device could be used, but the present arrangement with two separate devices has the added advantage that it conforms to the standard 8-bit format and allows the processor to handle the ENVELOPE function as a separate parameter.

Amplifier 944 is a standard audio (hi-fi) amplifier. It drives loudspeaker 190 or 191. (See also FIG. 1).

The generation of an ENVELOPE signal requires a time reference which is also best generated by a timer separate from processor 152. Circuit 952 is a DIVIDE BY M circuit provided for that purpose. It uses the "Q" (for "quality ") signal stored in latch 951 as a preset for the determination of the number of cycles of the sound wave that must be generated before a new change in the envelope patterns is due. Note that time, here, is relative in the sense that the envelope of a high frequency wave changes faster than that of a low frequency wave. This is consistent with the performance of natural sources of sound.

DIVIDE BY M output 953 is used to set flip-flop 956, whose output 955 flags computer 150. As soon as the computer is available for action, it cancels the flag by resetting flip-flop 956 via ACKNOWLEDGE line 954.

Thus it is seen that there has been brought to the data processing art a new and improved modular system for acquiring and processing data. This system is extremely flexible and may be adapted to various detectable inputs ranging from those provided by the system of the human body to those of the internal combustion engine and automobile. Numerous features of the modular system are configured to interact in an optimal way. Further, the architecture of the data processing system hardware facilitates and simplifies otherwise impossibly complex programming tasks and, thus, provides an additional significant and distinct advantage over prior art systems.

While this invention has been described in its presently preferred embodiment, it is by no means so limited in scope. Rather, its scope is to be ascertained by reference to the set of claims, and all equivalents thereof, that follows.

What is claimed is:

1. A system wherein CRT display means is of an alphanumeric graphic type, also known as a vector generator, and comprising the following combination:

an array of eight identical electronic circuit means for latching and storing digital information consisting of the X and Y coordinates of the position of an object, the X and Y coordinates of the end point of a given vector or straight line segment, the slew rate of said vector and the color or intensity of said vector, there being two such means for the X coordinates of said end point and two for the Y coordinate of said end point, and one such means each for the X position, the Y position, the slew rate and color or intensity;

an arry of seven identical multiplying digital to analog converter means, one for each latching and storing means as above except for the color or intensity information;

means for steering said X and Y coordinate of end point information into one pair of said X and Y latching and storing means when generating odd-numbered vectors and into the remaining pair when generating even-numbered vectors, in such a way that coordinate information is always loaded into the X and Y latching and storing means connected to said multiplying digital to analog converter means whose reference voltage happens to be zero or minimum;

means for generating two complementary, linearly increasing or decreasing reference voltages to be used as references for said four multiplying digital to analog converter means whose digital input is an X or Y coordinate of end point as above;

means for controlling the slew rate of said reference voltages in response to a digital code representative of slew rate as above;

means for generating cathode drive signals for a CRT upon input of a digital code representative of color or intensity as above, there being generated three cathode signals in the case of a color CRT, and only one cathode signal in the case of a monochrome CRT;

means for controlling and adjusting the range of the reference voltages of said four multiplying digital to analog converter means used for the generation of X and Y position voltages in the generation of individual vectors as above;

means for turning "on" the video circuits of said CRT and controlling the time interval during which video is turned "on" to coincide with the time interval during which said reference voltages are in transition between a maximum and a minimum value that can be changed or adjusted for optimum "closure" or angle transition between interconnected vectors;

means for summing analog signals generated at the output of said digital to analog conversion means pertaining to the X axis and converting them into an equivalent horizontal deflection current in the horizontal deflection yoke of said color or monochrome CRT;

identical summing and deflection means for the Y axis or vertical deflection yoke of said color or monochrome CRT.

* * * * *